United States Patent
Kim

(10) Patent No.: US 8,263,245 B2
(45) Date of Patent: Sep. 11, 2012

(54) CAP ASSEMBLY AND SECONDARY BATTERY USING THE SAME

(75) Inventor: Dae-Kyu Kim, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 994 days.

(21) Appl. No.: 12/256,035

(22) Filed: Oct. 22, 2008

(65) Prior Publication Data
US 2009/0130552 A1 May 21, 2009

(30) Foreign Application Priority Data

Nov. 19, 2007 (KR) .................. 10-2007-0117739

(51) Int. Cl.
*H01M 2/36* (2006.01)
*H01M 2/00* (2006.01)
*H01M 2/08* (2006.01)

(52) U.S. Cl. ............ 429/73; 429/163; 429/175; 429/185

(58) Field of Classification Search .................. None
See application file for complete search history.

(56) References Cited

U.S. PATENT DOCUMENTS

| 2007/0148533 A1* | 6/2007 | Anglin et al. | 429/56 |
| 2008/0124625 A1* | 5/2008 | Hock et al. | 429/176 |

FOREIGN PATENT DOCUMENTS

| JP | 54-50933 | 4/1979 |
| JP | 2003-257414 | 9/2003 |
| JP | 2005-158649 | 6/2005 |
| KR | 20-0132391 | 9/1998 |
| KR | 2006-112745 | 11/2006 |
| KR | 2007-68849 | 7/2007 |

OTHER PUBLICATIONS

Machine translation of JP 2003-257414, Kiyomiya et al., Sep. 12, 2003.*
Korean Notice of Allowance issued Jan. 13, 2010, in corresponding Korean Patent Application No. 10-2007-0117739.
Office Action issued by the Korean Intellectual Property Office in Korean Patent Application No. 10-2007-0117739 on May 6, 2009.

* cited by examiner

*Primary Examiner* — Barbara Gilliam
*Assistant Examiner* — Kwang Han
(74) *Attorney, Agent, or Firm* — Knobbe Martens Olson & Bear LLP

(57) ABSTRACT

A cap assembly to prevent the leakage of an electrolyte and a secondary battery including the cap assembly. The cap assembly comprises a cap plate having an electrolyte inlet is formed, and an electrolyte inlet switch board to selectively cover the electrolyte inlet. The electrolyte inlet switch board can be shaped as a rectangular prism, can have a corrugated surface, or can have corrugations formed on two opposing surfaces.

18 Claims, 5 Drawing Sheets

CAP ASSEMBLY AND SECONDARY BATTERY USING THE SAME

CROSS-REFERENCE TO RELATED APPLICATIONS

This application claims the benefit of Korean Patent Application No. 2007-117739, filed Nov. 19, 2007, the disclosure of which is hereby incorporated herein by reference in its entirety.

BACKGROUND OF THE INVENTION

1. Field of the Invention

Aspects of the present invention relate to a cap assembly to prevent leakage of an electrolyte and to improve welding, and a secondary battery using the cap assembly.

2. Description of the Related Art

A secondary battery, such as a lithium secondary battery, is a chemical battery that can be repetitively charged and discharged. As portable electronic devices, such as portable phones, notebook computers, PDAs, etc., have been widely distributed, the demand for secondary batteries has greatly increased worldwide.

Lithium secondary batteries include lithium metal secondary batteries, lithium ion secondary batteries, lithium ion polymer secondary batteries, lithium polymer secondary batteries, and so on. Lithium ion secondary batteries have been widely used in electronic devices, such as portable phones, camcorders, digital cameras, notebook computers, and MD players, because they have a high operating voltage (3.6 volt), high performance, and are light-weight.

A lithium ion secondary battery comprises: an electrode assembly including a positive electrode plate, a negative electrode plate, and a separator; and electrolyte to transfer lithium ions. A lithium ion secondary battery can explode, when a transition metal is exposed to air, due to leakage of the electrolyte, or if the internal pressure is suddenly increased, due to a chemical reaction during over-charging. Accordingly, a protection module should be provided for commercial usage.

A lithium polymer secondary battery has benefits in that there is no risk of explosion, and it can be implemented in a variety of shapes, because it contains a gel-type electrolyte. A lithium polymer secondary battery comprises an electrode assembly including a positive electrode plate, a negative electrode plate, and a separator disposed between the positive electrode plate and the negative electrode plate, to transfer lithium ions.

Since a lithium polymer secondary battery uses a high molecular weight, gel-type electrolyte, it can have a strong resistance to chemical reactions resulting from over-charging and over-discharging. Accordingly, a lithium polymer secondary battery does not require a protection module.

Lithium ion secondary batteries can be prismatic, cylindrical, and pouch-type, according to a shape of casing containing the electrode assembly. In a prismatic lithium ion secondary battery, the casing can generally be made of a metal, such as aluminum. Further, a lithium ion secondary battery may be prismatic, or cylindrical.

When constructing a secondary battery, an opening is formed at one side of a casing, an electrode assembly is inserted into the casing through the opening, and then an electrolyte is injected. Next, the opening is sealed with a cap assembly. The cap assembly may comprise a cap plate that corresponds to the opening. An electrolyte inlet may be formed on the cap plate, through which an electrolyte is injected.

The secondary battery is charged a first time, and gas generated during the charging is removed. During the gas removal, the electrolyte may leak from the electrolyte inlet, and stain an area around the electrolyte inlet. Accordingly, when an electrolyte inlet cap is welded to the electrolyte inlet, the electrolyte may compromise the weld.

SUMMARY OF THE INVENTION

Aspects of the present invention provide a cap assembly comprising a cap plate having an electrolyte inlet. The cap assembly comprises an electrolyte inlet switch board on a bottom surface of the cap plate.

Aspects of the present invention provide a second battery comprising a cap assembly including a cap plate. The cap assembly includes an electrolyte inlet switch board on a bottom surface of the cap plate.

According to some embodiments, the electrolyte inlet switch board is a leaf spring.

According to some embodiments, the electrolyte inlet switch board covers the electrolyte inlet.

According to some embodiments, the electrolyte inlet switch board is made of the same material as the cap plate.

According to some embodiments, the electrolyte inlet switch board is formed of one selected from a group consisting of aluminum, stainless steel, and stainless steel plated with nickel.

According to some embodiments, the electrolyte inlet switch board is formed as a flat board.

According to some embodiments, the electrolyte inlet switch board has corrugations formed on one surface thereof.

According to some embodiments, a thickness of the electrolyte inlet switch board can be more than approximately 0.1 mm, and less than approximately 0.5 mm.

According to some embodiments, the height of the bumps of the electrolyte inlet switch board can be more than approximately 0.2 mm, and less than approximately 0.5 mm.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent, and more readily appreciated, from the following description of the exemplary embodiments, taken in conjunction with the accompanying drawings, of which.

DETAILED DESCRIPTION OF THE EMBODIMENTS

Figure 1:
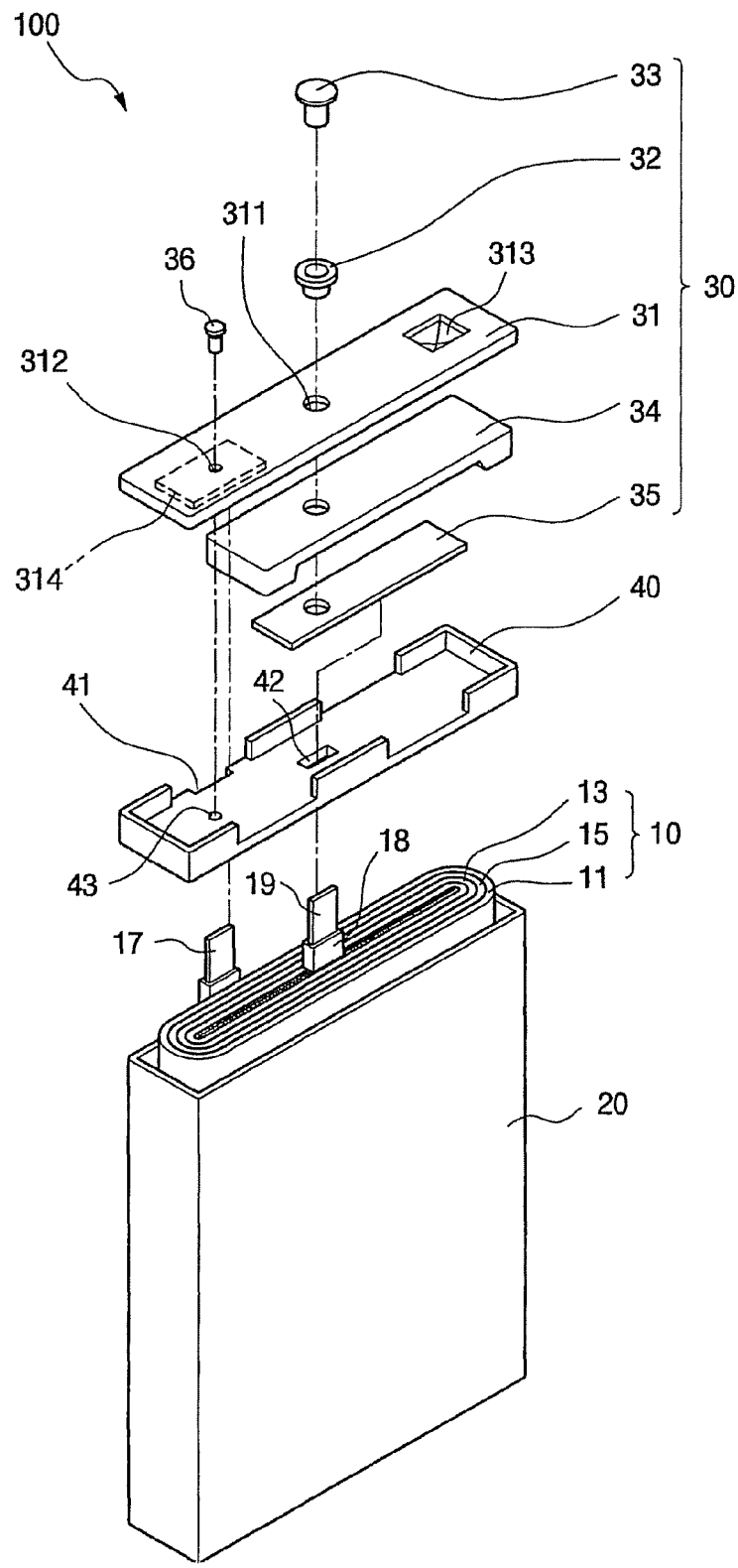
FIG. 1 is an exploded perspective view illustrating the configuration of a secondary battery, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures. The thickness and length of layers and regions may be exaggerated.

Figure 2:
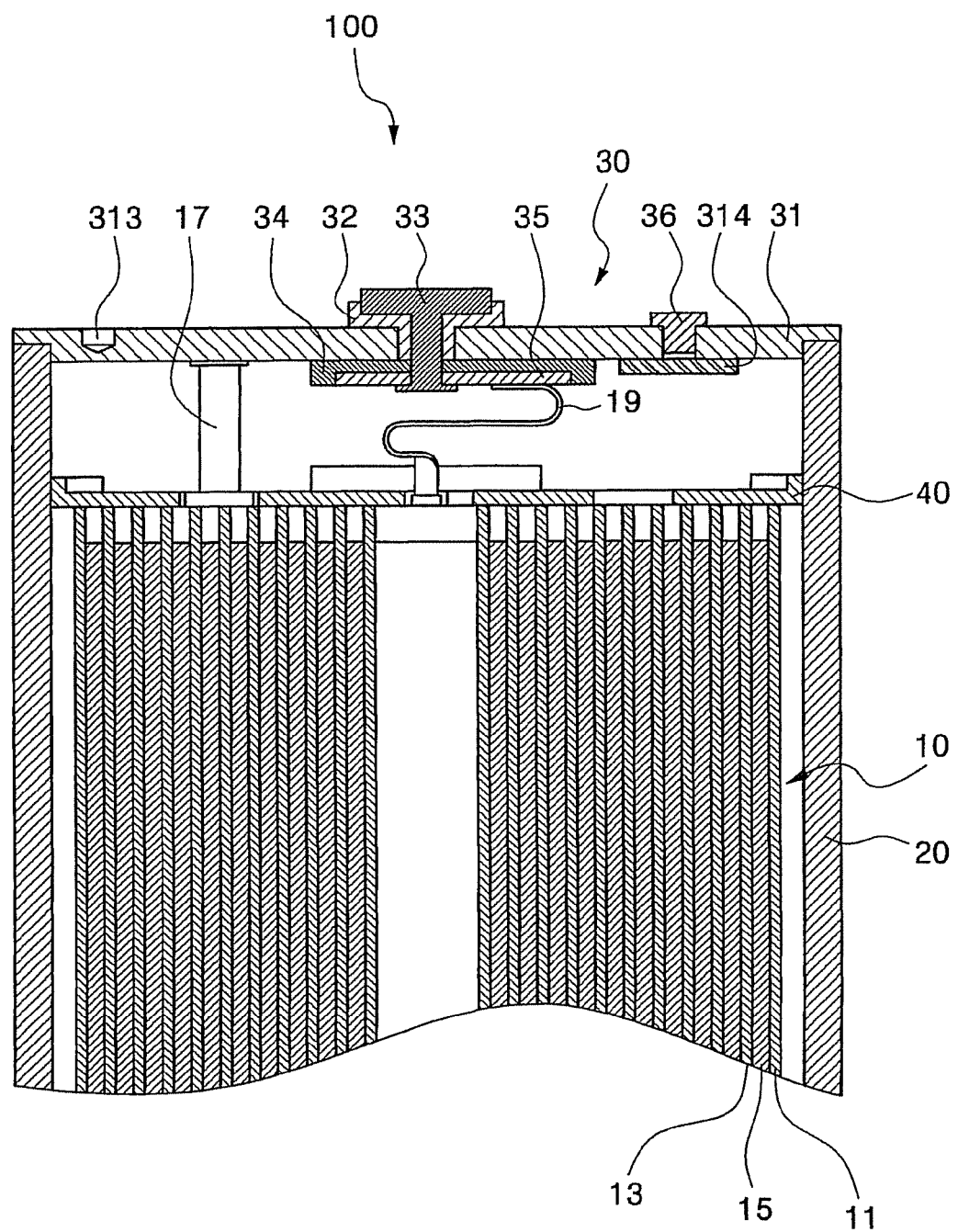
FIG. 2 is a combined sectional view illustrating the secondary battery of FIG. 1.

FIG. 1 is an exploded perspective view illustrating the configuration of a secondary battery, according to a first exemplary embodiment of the present invention, and FIG. 2 is a combined sectional view illustrating the secondary battery of FIG. 1. Referring to FIG. 1 and FIG. 2, a secondary battery 100 may comprise an electrode assembly 10, a can 20 to house the electrode assembly 10, and a cap assembly 30 disposed on an opening of the can 20.

The secondary battery 100 may comprise an insulating case 40 disposed on an upper portion of the electrode assembly 10. The electrode assembly 10 may comprise a first electrode plate 11, a second electrode plate 13 and a separator 15. The electrode assembly 10 may be wound in a jellyroll-type shape.

The first electrode plate 11 is referred to as a positive electrode plate, and the second electrode plate 13 is referred to as a negative electrode plate, for convenience. The polarity of the first and second electrode plates 11 and 13 may be changed. The positive electrode plate 11 is formed by coating a positive electrode active material into a positive electrode collector, which can be made of aluminum, etc. The positive electrode collector has a non-coating portion, where the positive electrode active material is not coated.

The negative electrode plate 13 is formed by coating a negative electrode active material into a negative electrode collector, which can be made of copper, etc. The negative electrode collector has a non-coating portion, where the negative electrode active material is not coated.

The separator 15 is interposed between the positive electrode plate 11 and the negative electrode plate 13, to prevent a short therebetween. The surface of the separator 15 has a porous film structure, to allow lithium ions to pass there through.

A first electrode tab 17 may be attached on the positive non-coating portion, and to a cap plate 31 of the cap assembly 30. A second electrode tab 19 may be attached on the negative non-coating portion, and to an electrode terminal 33 of the cap assembly 30. Accordingly, the first electrode tab 17 may have the same polarity as the positive electrode plate 11, and the second electrode tab 19 may have the same polarity as the negative electrode plate 13. Hereinafter, the first electrode tab 17 is referred to as a positive electrode tab, and the second electrode tab 19 is referred to as a negative electrode tab.

The positive and negative electrode tabs 17 and 19 may be formed of nickel, and the like, and may be attached to the positive and negative electrode non-coating portions, respectively, by ultrasonic welding, laser welding, and the like. The materials and methods of attaching are not limited thereto.

Insulating tapes 18 may be wound on both the positive and negative electrode tabs 17 and 19. The insulating tapes 18 prevent a short between the positive and negative electrode tabs 17 and 19, and other components of the secondary battery 100.

The positive electrode collector may be made of stainless steel, nickel, aluminum, titanium, an alloy thereof. For example, the positive electrode current collector can be made of a material that is surface treated with carbon, nickel, titanium, silver, and the like. In some embodiments, aluminum or an aluminum alloy are used, for example. The positive electrode collector may be a foil, a film, or a sheet. The positive electrode collector may be punched, and/or may include a porous membrane, a foaming agent, and the like. The thickness of the positive electrode collector may be about 1~50 um, for example, about 1~30 um. However, the shape and thickness are not so limited in the present invention. In some embodiments the positive electrode active material includes at least one member of the group consisting of cobalt, manganese, and nickel. The positive electrode active material can be a compound of lithium, and a material that facilitates the capture and release of lithium ions.

The negative electrode collector may be made of stainless steel, nickel, copper, titanium, or alloy thereof. For example, a material that is surface treated with carbon, nickel, titanium, or silver, and the like, can be used. In some embodiments, copper or a copper alloy are used. The negative electrode collector may be a foil, a film, or a sheet, and may be punched. The negative electrode collector may include porous membrane, a foaming agent, and the like. The thickness of the negative electrode collector may be about 1~50 um, for example, about 1~30 um. However, the shape and thickness are not so limited in the present invention. The negative electrode collector may include carbon materials, lithium metal, a lithium alloy, and the like, such as crystalline carbon, amorphous carbon, a carbon complex, a carbon fiber, and the like, which can absorb or release lithium ions.

The separator 15 may be a generally known separator material, such as a thermoplastic resin of Polyethylene (PE), Polypropylene (PP), and the like. The surface of the separator 15 may have a porous structure. Such a porous structure will be turned into an insulating film and/or interrupted, if the separator 15 is melted at around a melting point of the thermoplastic resin, due to an increase of internal temperature of the battery. The insulating film interrupts the flow of lithium ions between the positive electrode plate 11 and the negative electrode plate 13. Accordingly, if the flow of ions is interrupted, the internal temperature may not increase to a dangerous level.

The can 20 has an opening, may be formed of metal, and houses the electrode assembly 10 and electrolyte. As the metal, aluminum, an aluminum alloy, or stainless steel, may be used. The can 20 may have a polarity, so the can 20 may be used as an electrode terminal. The shape of the can 20 may prismatic or cylindrical. The opening of the can 20 may be welded, or heat pressed, to the cap plate 31, to seal the can 20.

The cap assembly 30 comprises a cap plate 31, an insulating gasket 32, an electrode terminal 33, an insulating plate 34, a terminal plate 35, and an electrolyte inlet cap 36. The cap plate 31 may be combined with the opening of the can 20, in order to seal the can 20. The cap plate 31 may have the same shape and size as the opening. The cap plate 31 may have a terminal hole 311, into which the insulating gasket 32 and electrode terminal 33 can be inserted. The electrolyte inlet 313 may be formed on the cap plate 31, to provide a passage for injecting the electrolyte into the can 20. An electrolyte inlet cap 36 may be combined over the electrolyte inlet 312, to seal the inlet 312.

The cap plate 31 may comprise a vent 313 to exhaust gas from the battery. A notch may be formed on the vent 313, as a breakpoint of the vent 313. The cap assembly 30 may comprise an electrolyte inlet switch board 314 to cover the electrolyte inlet 312, on a bottom surface of the cap plate 31. The electrolyte inlet switch board 314 may be movable toward and away from the cap plate 31. The electrolyte inlet switch board 314 may include a leaf spring.

The insulating gasket 32 may be inserted into the terminal hole, and may be made of insulating material. The insulating gasket 32 insulates the electrode terminal 33 from the cap plate 31. The insulating gasket 32 may have a hole in a center portion thereof, through which the electrode terminal 33 can be inserted.

The electrode terminal 33 may be inserted into the cap plate 31. A lower portion of the electrode terminal 33 may be combined with a terminal plate 35. The insulating plate 34 may be disposed on a bottom surface of the cap plate 31, and may insulate an outer surface of the terminal plate 35 from the cap plate 31. The insulating plate 34 may have a hole to connect the electrode terminal 33 to the terminal plate 35.

The terminal plate 35 may be disposed on the bottom surface of the insulating plate 34. The terminal plate 35 may be made of conductive material, and may also form an electrical path by connecting to the electrode terminal 33. The negative electrode tab 19 may be electrically connected to the bottom surface of the terminal plate 35, so the electrode terminal 33 may be a negative electrode terminal.

The insulating case 40 may be disposed on a top portion of the electrode assembly 10, and can prevent the electrode assembly 10 from moving. The insulating case 40 may house the terminal plate 35 and insulating plate 34. The insulating case 40 may have a tab groove 41 and a tab hole 42, through which the positive and negative electrode tabs 17 and 19 protrude. An injecting hole 43 may be formed on the insulating case 40, through which the electrolyte is injected into the electrode assembly 10.

Figure 3:
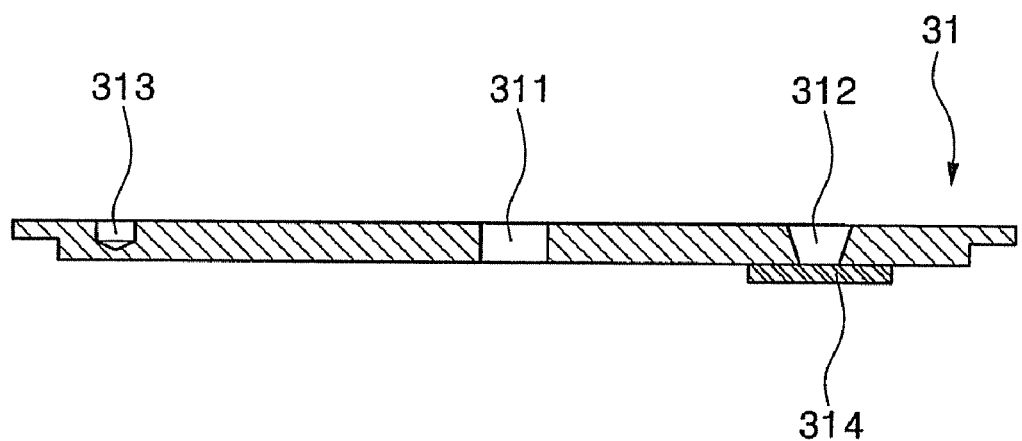
FIG. 3 is a sectional view illustrating a cap plate and an electrolyte inlet switch board, according to an exemplary embodiment of the present invention.

FIG. 3 is a sectional view illustrating a cap plate 31, on which an electrolyte inlet switch board 314 is formed, according to an exemplary embodiment of the present invention, FIGS. 4A through 4E are drawings illustrating various exemplary embodiments of electrolyte inlet switch boards. Referring to FIG. 3, one side of the electrolyte inlet switch board 314 may be fixed to the cap plate 31. The electrolyte switch board 314 can move up and down, according to an outside pressure. The electrolyte switch board 314 may be fixed by a joining or a coiling method.

The electrolyte inlet switch board 314 is joined to the cap plate 31, by either laser welding or resistance welding. Accordingly, while the electrolyte inlet switch board 314 is moved up and down, the electrolyte inlet switch board 314 may close or open the electrolyte inlet 312. It may be preferable that the electrolyte inlet switch board 314 be formed with the same material as the cap plate 31, for easy joining. Aluminum, stainless steel, or stainless steel plated with nickel may be used as the material.

Figure 4A:
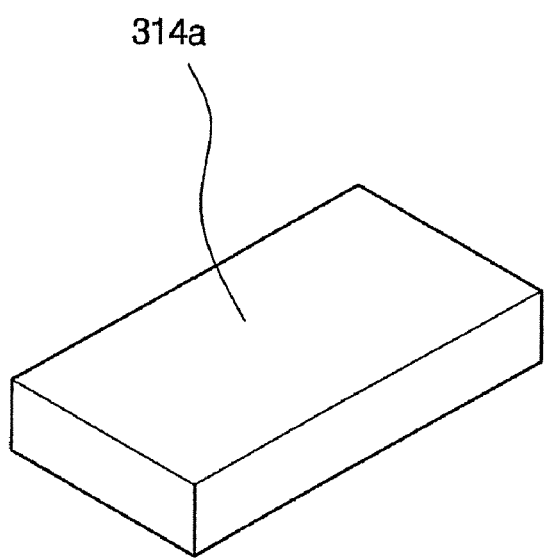
FIG. 4A is a perspective view illustrating the electrolyte inlet switch board, according to an exemplary embodiment of the present invention.
Figure 4B:
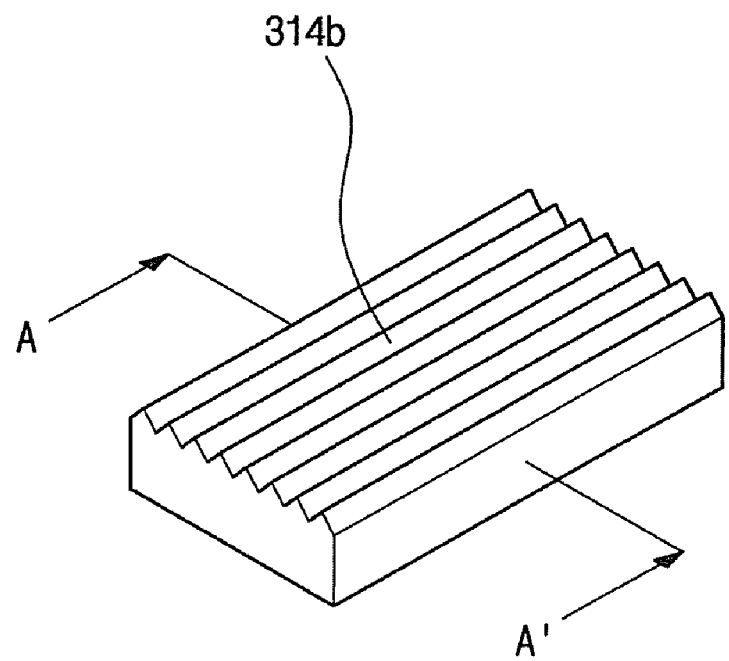
FIG. 4B is a perspective view illustrating a electrolyte inlet switch board, according to an exemplary embodiment of the present invention.
Figure 4C:
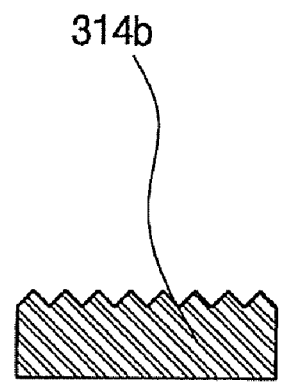
FIG. 4C is a sectional view taken along the line A-A' of FIG. 4B.
Figure 4D:
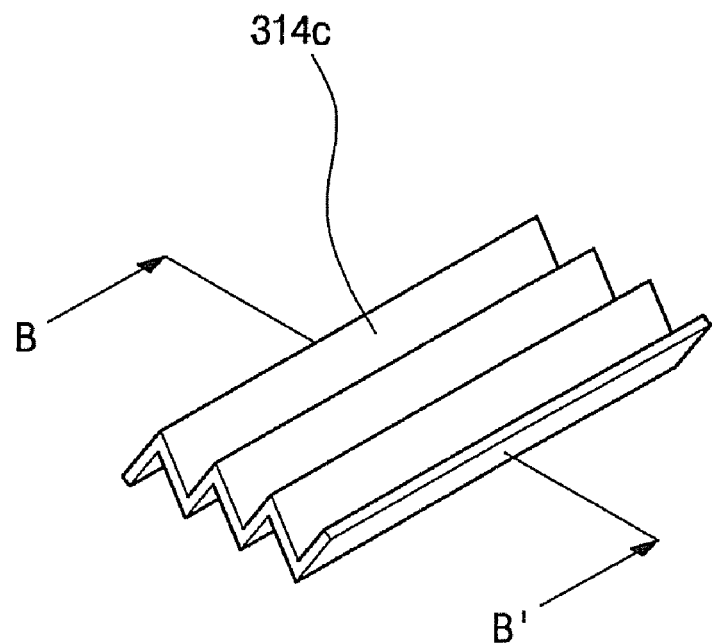
FIG. 4D is a perspective view illustrating an electrolyte inlet switch board, according to an exemplary embodiment of the present invention.
Figure 4E:
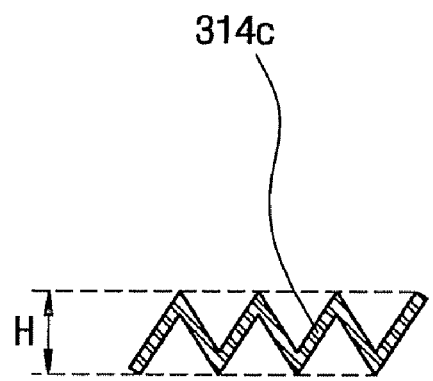
FIG. 4E is a sectional view taken along line B-B' of FIG. 4D.

FIG. 4A is a perspective view illustrating an electrolyte inlet switch board 314a, according to a first exemplary embodiment of the present invention. FIG. 4B is a perspective view illustrating an electrolyte inlet switch board 314b, according to a second exemplary embodiment of the present invention. FIG. 4C is a sectional view taken along the line A-A' of FIG. 4B. FIG. 4D is a perspective view illustrating a electrolyte inlet switch board 314c, according to a third exemplary embodiment of the present invention, and FIG. 4E is a sectional view taken along the line B-B' of FIG. 4D. Referring to FIGS. 4A through 4E, the electrolyte inlet switch board 314a is a flat board (rectangular prism), as illustrated in FIG. 4A. The electrolyte inlet switch board 314b is a flat board having a corrugated surface that contacts the electrolyte inlet 312, as illustrated in FIG. 4B. The electrolyte inlet switch board 314c has corrugations on two opposing sides, as illustrated in FIG. 4D.

When the electrolyte inlet switch board 314a is used, the electrolyte inlet switch board 314a can be opened, in order to release gas generated at first charge. When the electrolyte inlet switch boards 314b and 314c are used, no opening is required, because the gas can be exhausted through the corrugations.

If the electrolyte inlet switch boards 314a and 314b are too thin, the electrolyte inlet switch boards 314a and 314b may be damaged, when pressing the electrolyte inlet switch boards 314a and 314b, during electrolyte injection and gas release. If the electrolyte inlet switch boards 314a and 314b are too thick, a higher pressure may be needed when pressing the electrolyte inlet switch boards 314a and 314b. Accordingly, the thickness of the electrolyte inlet switch boards 314a and 314b may be more than approximately 0.1 mm, and less than approximately 0.5 mm. However, it may not be limited thereto.

If the electrolyte inlet switch board 314c has too small of a height (H), it may take a long time to exhaust the gas. If the height (H) is too large, the gas and electrolyte may leak out through grooves. Accordingly, the height can be more than approximately 0.2 mm, and less than approximately 0.5 mm.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A cap assembly comprising:
a cap plate comprising:
a lower surface facing an electrode assembly,
an upper surface facing away from the lower surface, and
an electrolyte inlet opening formed through the cap plate; a leaf spring attached to the lower surface to cover the electrolyte inlet opening from below the lower surface, the leaf spring being configured to block or unblock the electrolyte inlet opening from below the lower surface in response to pressure; and
a plug configured to cover the electrolyte inlet opening from above the upper surface.

2. The cap assembly of claim 1, wherein the leaf spring is attached to the lower surface by laser welding or resistance welding.

3. The cap assembly of claim 1, wherein the leaf spring is formed of the same material as the cap plate.

4. The cap assembly of claim 1, wherein the leaf spring is formed of one selected from the group consisting of aluminum, stainless steel, and nickel plated stainless steel.

5. The cap assembly of claim 1, wherein the leaf spring is formed as a rectangular prism.

6. The cap assembly of claim 5, wherein the leaf spring has corrugations formed on a surface thereof that faces the cap plate.

7. The cap assembly of claim 1, wherein the leaf spring has corrugations formed on two opposing surfaces thereof.

8. The cap assembly of claim 5, wherein the thickness of the leaf spring is greater than approximately 0.1 mm, and less than approximately 0.5 mm.

9. The cap assembly of claim 7, wherein the height of the leaf spring is greater than approximately 0.2 mm, and less than approximately 0.5 mm.

10. A secondary battery comprising:
a cap assembly comprising,
a cap plate comprising:
- a lower surface facing an electrode assembly,
- an upper surface facing away from the lower surface, and
- an electrolyte inlet opening formed through the cap plate;

a leaf spring attached to the lower surface to cover the electrolyte inlet opening from below the lower surface, the leaf spring being configured to block or unblock the electrolyte inlet opening from below the lower surface in response to pressure; and a plug configured to cover the opening from above the upper surface.

11. The secondary battery of claim 10, further comprising:
an electrode assembly; and
a can to house the electrode assembly, having an opening in which the cap assembly is disposed.

12. The secondary battery of claim 10, wherein the leaf spring is formed of the same material as the cap plate.

13. The secondary battery of claim 10, wherein the leaf spring is formed of one selected from the group consisting of aluminum, stainless steel, and nickel plated stainless steel.

14. The secondary battery of claim 10, wherein the leaf spring is formed as a rectangular prism.

15. The secondary battery of claim 14, wherein the leaf spring has corrugations formed on a surface thereof that faces the cap plate.

16. The secondary battery of claim 10, wherein the leaf spring has corrugations formed on two opposing surfaces thereof.

17. The secondary battery of claim 14, wherein the thickness of the leaf spring is greater than approximately 0.1 mm, and less than approximately 0.5 mm.

18. The cap assembly of claim 16, wherein the height of the leaf spring is greater than approximately 0.2 mm, and less than approximately 0.5 mm.

* * * * *